(12) United States Patent
Zemp et al.

(10) Patent No.: US 9,823,112 B2
(45) Date of Patent: Nov. 21, 2017

(54) REAL-TIME STRUCTURAL MEASUREMENT (RTSM) FOR CONTROL DEVICES

(71) Applicant: PONTIFICIA UNIVERSIDAD CATOLICA DE CHILE, Santiago (CL)

(72) Inventors: René Zemp, Santiago (CL); Juan Carlos De La Llera, Santiago (CL)

(73) Assignee: Pontificia Universidad Catolica de Chile, Santiago (CL)

( * ) Notice: Subject to any disclaimer, the term of this patent is extended or adjusted under 35 U.S.C. 154(b) by 155 days.

(21) Appl. No.: 14/429,955

(22) PCT Filed: Sep. 11, 2013

(86) PCT No.: PCT/CL2013/000064
§ 371 (c)(1),
(2) Date: Apr. 16, 2015

(87) PCT Pub. No.: WO2014/043825
PCT Pub. Date: Mar. 27, 2014

(65) Prior Publication Data
US 2015/0247754 A1  Sep. 3, 2015

(30) Foreign Application Priority Data

Sep. 21, 2012 (CL) .................................. 2626-2012

(51) Int. Cl.
*G01H 1/00* (2006.01)
*G01B 5/30* (2006.01)
(Continued)

(52) U.S. Cl.
CPC .............. *G01H 1/003* (2013.01); *G01B 5/30* (2013.01); *G01B 7/16* (2013.01); *G01B 11/16* (2013.01); *G01H 1/00* (2013.01)

(58) Field of Classification Search
CPC . G01H 1/003; G01H 1/00; G01B 5/30; G01B 7/16; G01B 11/16
See application file for complete search history.

(56) References Cited

U.S. PATENT DOCUMENTS

2005/0284221 A1  12/2005  Danisch et al.
2011/0029276 A1  2/2011  Cabral Martin

FOREIGN PATENT DOCUMENTS

CN    201413139 Y   2/2010
CN    101975568 A   11/2011
(Continued)

OTHER PUBLICATIONS

Khoo, Victor H.S. et al.; Monitoring of High Rise Building using Real-Time Differential GPS; FIG Congress 2010, Facing the Challenges—Building the Capacity; Apr. 11-16, 2010; Sydney, Australia; pp. 1-14.
(Continued)

*Primary Examiner* — Helen Kwok
(74) *Attorney, Agent, or Firm* — Ulmer & Berne LLP

(57) ABSTRACT

Relative displacements related to a structure are measured for use of a feedback signal in real time for the structural monitor of active and semi-active vibration. The monitors reduce structural movement caused by any source of natural or artificial vibration. A pre-stressed axial element is installed between two different points of the structure using a fixed connector and a flexible one. As the structure vibrates in response to an external "source", a relative displacement is caused between two connecting points of the axial element, which can be measured based on the rotation φ of the flexible connector of the axial element. Discrete displacement can be obtained in real time of the whole structure where the axial element is installed. A modal monitor (Continued)

through active or semi-active devices can improve the structural behavior in some cases.

14 Claims, 2 Drawing Sheets

(51) Int. Cl.
   *G01B 7/16* (2006.01)
   *G01B 11/16* (2006.01)

(56) References Cited

FOREIGN PATENT DOCUMENTS

| DE | 102009026002 A1 | 12/2010 |
|---|---|---|
| JP | 200140906 A | 2/2001 |
| JP | 2001249036 A | 9/2001 |
| SU | 901818 | 1/1982 |

OTHER PUBLICATIONS

Matsuya, Iwao, et al.; Development of Lateral Displacement Sensor for Real-Time Detection of Structural Damage; IEEJ Trans 2011, vol. 6; Mar. 1, 2009; pp. 266-272.

Park, Jong-Woong, et al.; Vision-based displacement measurement method for high-rise building structures using partitioning approach; NDT&E International 43 (2010); Jul. 16, 2010; pp. 642-647.

Massimiliano, Pieraccini, et al.; A microwave interferometer with imaging capability for remote measurements of building displacements; International Symposium Non-Destructive Testing in Civil Engineering 2003; 5 pages.

Lee, J. J. et al.; Real-Time Displacement Measurement of a Flexible Bridge Using Digital Image Processing Techniques; Experimental Mechanics (2006) 46; Nov. 9, 2005; pp. 105-114.

Lee, Jong Jae et al.; Evaluation of Bridge Load Carrying Capacity Based on Dynamic Displacement Measurement Using Real-time Image Processing Techniques; Steel Structures 6 (2006); pp. 377-385.

Jeon, Haemin et al.; A paired visual servoing system for 6-DOF displacement measurement of structures; Smart Mater. Stuct. 20 (2011); Mar. 28, 2011; pp. 1-16.

Kijewski-Correa, T., et al.; Experimental Verification and Full-Scale Deployment of Global Positioning Systems to Monitor the Dynamic Response of Tall Buildings; Journal of Structural Engineering, Aug. 1, 2006; pp. 1242-1253; vol. 132, No. 8.

Kijewski-Correa, T., et al.; Monitoring the wind-induced response of tall buildings: GPS performance and the issue of multipath effects; Journal of Wind Engineering and Industrial Aerodynamics 95 (2007); Mar. 19, 2007; pp. 1176-1198.

Poizat, Christophe; Written Opinion of the International Preliminary Examining Authority, issued in International Application No. PCT/CL2013/000064; dated Nov. 19, 2014; 6 pages.

Poizat, Christophe; International Preliminary Report on Patentability, issued in International Application No. PCT/CL2013/000064; dated Feb. 5, 2015; 31 pages including Response to Written Opinion of the International Preliminary Examining Authority submitted by Applicant dated Jan. 19, 2015.

REAL-TIME STRUCTURAL MEASUREMENT (RTSM) FOR CONTROL DEVICES

The present invention shows a solution to measure the relative displacements related to a structure in order to use the signal measured as feedback signal in real time for the structural monitor of the active and semi-active vibration. Said monitors reduce the structural movement caused by any source of natural or artificial vibration. The conventional measurement methods of the relative displacement are often not able to accurately measure the displacement in real time. The delay in the signal measured often has a negative effect on the feedback monitor device.

The invention consists in a pre-stressed axial element (1), installed between two different points of the structure (2) using a fixed connector (5) and a flexible one (6). As the structure (2) vibrates in response to an external "source", a relative displacement is caused between two connecting points of the axial element, which can be measured based on the rotation φ of the flexible connector (5) of the axial element. In addition, at intermediate points of the axial element (1), the relative displacement between the structure (2) and the axial element (1) can be measured through sensors (3). With these measurements, the form of discrete displacement can be obtained in real time of the whole structure where the axial element (1) is installed.

In the event an axial element (4) is installed, where the highest mode passes through point zero, the modal displacement of this highest mode will not be measured. Assuming that the full displacement of the structure is associated with the first two modes, which is often a god approach in practice to earthquake-induced displacements, the modal displacement of these two modes can be measured independently in real time. A modal monitor through active or semi-active devices can improve the structural behavior in some cases.

In order to keep the disturbance level of the signal measured introduced by natural vibrations of the axial element (1) as low as possible, it is important that the fundamental frequencies of the axial elements (1) are significantly higher than the natural frequencies of the structure (2). For this goal to be achieved, using materials of the axial element is necessary, which have little density and can be highly pre-stressed, such as carbon fiber.

FIELD OF THE INVENTION

This invention corresponds to the field of monitoring structural displacement in real time. The invention was developed in order to provide information on the relative displacement that can be used for the monitor devices to be able to monitor in real time the active or semi-active structural vibration caused by events induced in natural or artificial way. Said vibrations can be induced by earthquakes, wind, machinery, persons, vehicles, man or others. Other applications are also possible in addition to the feedback monitor of active or semi-active devices, such as the monitoring of the structural health and others.

In the present invention, one or more axial elements are installed between two different points of a structure. As the structure vibrates, the relative rotation φ between the axial element and the structure can be measured, leading the relative displacement between the two points of the structure. With this information, the displacement form of the whole structure is obtained in real time at the discrete points where the axial element is installed.

STATE OF THE ART

The active and semi-active monitor devices are most frequently used to reduce the structural vibrations induced by earthquakes, wind, machines, persons or vehicles. In order to monitor the structure in the most efficient way, these devices need information about the displacement of the structure in real time. The more accurate the measurement of the structural movement, the better the behavior of these active and semi-active monitor devices. In fact, often only a little delay in time (a few hundredths of second or less, depending on the type of structure) of the signal measured is acceptable for the feedback monitor signal. This fact causes the development of this new system to measure the structural displacement in real time, which can be also used for other vibration applications.

Many active and semi-active structural monitor devices use relative displacements of the structure as feedback signal for the structural monitor. Traditionally, the practice of common engineering would use accelerometers at the two points to measure structural displacements. Therefore, the acceleration signal needs to be integrated twice in order to obtain the displacement in real time. For the signal to be integrated, the acceleration record should be band-pass filtered in real time. This filtering process in real time leads to delay in the time of the signal, which cannot be often accepted and its use with an active or semi-active device is prohibited.

Alternatively, the structural displacement can be measured through the differential global positioning system, DGPS, as described in [1], [8] and [9], which is the system most used in relation to the health monitoring. Thus, a specific antenna should be installed outside the office, where the position of the building is needed to be measured. By having at least 4 satellite views, the position of the structure can be measured and, therefore, the displacement of the structure. The measurement resolution is accurate enough, but the delay of the signal in time, makes it unusable for the monitor of active or semi-active devices. Since the health monitoring does not require true real time, this type of structural measurement is useful.

Another option to measure structural displacements in real time is the use of optical sensors. There are different types of optical sensors, which mainly find application in the area of structural health monitoring. A sensitive detector of position installed in the upper part of the floor measures the position of a light produced by a light-emitting diode (LED) installed in the bottom part of the floor. In [3], [5], [6] and [7], the relative displacement of the two points of the structure is detected by a camera. Through the processing of the image signal, the picture taken by the camera is transformed into displacement. A microwaves interferometer [4] is used with image capacity for remote measurements in order to measure the displacement of the building. In all these cases, the relative displacement can be measured in real time between two points of a structure, which are relatively near each other. In the publication already mentioned for the implementation of the building, the relative measurement comprises 3 floors as maximum. In order to measure the relative displacement between the base and the roof of medium-sized to high buildings, several optical sensors would have to be installed in cascade. Also, in all cases where the optical sensor is installed at a point of the structure, which experiences structural rotation, the displacement signal will be affected by this rotation and in order to obtain the target signal of relative displacement, also the rotation of the structure should be measured, which is not an easy task. In addition, said solution to measure the relative displacement through optical sensors between the base and the roof of a medium-sized to high building should need more space than that proposed by the invention herein to be installed.

In Patent US 201110029276A1 [10], different sensors are used as inclinometers, gyroscopes and accelerometers in order to determine the distortion in real time of a fixed or moving structure, such as buildings, airplanes or ships. Thus, the distortion of specific points of a structure is measured, but not the relative displacement between two different points of a structure, which is the purpose of this patent.

In Patent 101975568A [11], a method of measurement in real time using inclinometers is shown. Thus, the inclination of different points is measured, but not the relative displacement between two different points of a structure, which is the purpose of this patent.

In Patent 101975568A [11], a method of measurement in real time using inclinometers is shown. Thus, the inclination of different points is measured, but not the relative displacement between two different points of a structure, which is the purpose of this patent.

In Patent 200920033350.2 [12], a method of measurement in real time of building structures using a plurality of inclinometers is shown. Thus, the inclination of specific points of a structure is measured, but not the relative displacement between two different points of a structure, which is the purpose of this patent.

In Patent JP 2001040906 (A) [13], a monitor system in real time is proposed for an active device to dissipate the movement from earthquakes. Thus, the patent focuses on the processing of date in real time for any type of sensors, but not to measure relative displacements as this invention.

The invention shown in this patent provides a solution to the problems mentioned above, i.e. how to measure the relative displacement of a structure in real time both in an accurate and economic way, in order to monitor an active or semi-active device with the signal measured. An advantage of this invention is that the system needs relatively little space to be installed. For example, in the case of a building, the system can be installed inside the core of the elevator.

1. Victor H. S. KHOO, Yam Khoon TOR, Gerry ONG. *Monitoring of High Rise Building using Real-Time Differential GPS*, Congreso FIG 2010 Sydney, Australia.
2. Iwao Matsuya, Ryota Tomishi, Maya Sato et. al. *Development of Lateral Displacement Sensor for Real-Time Detection of Structural Damage*, IEEJ Transactions on Electrical and Electronic Engineering 2011; 6: 266-272
3. Jong-Woong Park, Jong-JaeLee, Hyung-JoJung, Hyun-Myung. *Vision-based displacement measurement method for high-rise building structures using partitioning approach*. NDT&E International 2010; 43: 642-647
4. Massimiliano Pieraccini, Guido Luzi, Daniele. Mecatti, et. al. *A microwave interferometer with imaging capability for remote measurements of building displacements*. Simposio Internacional de Testeo No Destructivo en Ingeniería Civil, 2003.
5. J. J. Lee & M. Shinozuka. *Real-Time Displacement Measurement of a Flexible Bridge Using Digital Image Processing Techniques*. Mecánica Experimental, 2006; 46: 105-114.
6. Jong Jae Lee, Soojin Cho, Masanobu Shinozuka, et. al. *Evaluation of Bridge Load Carrying Capacity Based on Dynamic Displacement Measurement Using Real-time Image Processing Techniques*. Estructuras de Acero, 2006; 6: 377-385
7. Haemin Jeon, Yousuk Bang, Hyun Myung. *A paired visual serving system for 6-DOF displacement measurement of structures*, Smart Materials Structures 2011; 20: 045019 (16pp)
8. T. Kijewski-Correa, A. Kareem, M. Kochly. *Experimental Verification and Full-Scale Deployment of Global Positioning Systems to Monitor the Dynamic Response of Tall Buildings*. Revista de Ingenieria Estructural (ASCE) 2006; 132:8 1242-1253
9. Tracy Kijewski Correa, Michael Kochly, *Monitoring the wind-induced response of tall buildings: GPS performance and the issue of multipath effects*. Revista de Ingeniería del Viento y Aerodinámica Industrial, 2007; 95: 1176-1198
10. Miguel Luis Cabral Martin, *System and procedure for the real-time monitoring of fixed or mobile rigid structures such as building structures, aircraft, ships and/or the like*, Pub. No.: US 2011/0029276 A1, 2011.
11. Tong Gang, Wu Zhiyong, Wang Tao, Cui Ming, *High-precision real-time measuring system for platform inclination and application method thereof*, Pub. No.: 101975568 A, 2011
12. *Large building structure state real-time monitoring system*, Pub. No.: 200920033350.2, 2010
13. Kurata Shigeto, Takahashi Genichi, Matsunaga Yoshinori, et. al., *Real-time monitor system for active seismic monitor structure*, Pub. No.: JP2001040906 (A), 2010

DESCRIPTION OF DRAWINGS

Below, the invention will be described by referring to the figures in the Appendix, where.

Left: front view and right: cross-section of the connection.

1 axial element/2 structure/3 relative displacement sensor between the axial element and the structure/4 second axial element/5 fixed connection/6 flexible connections/7 threaded bars/8 steel plates/9 screws/10 bolts/11 laser sensor

DETAILED DESCRIPTION OF THE INVENTION

The invention refers to a solution to measure the relative displacements of the structures in real time, using the signal, for example, to monitor an active or semi-active structural monitor device. Applications are also possible in other areas, as in the health monitoring of the structural vibration.

Figure 1:
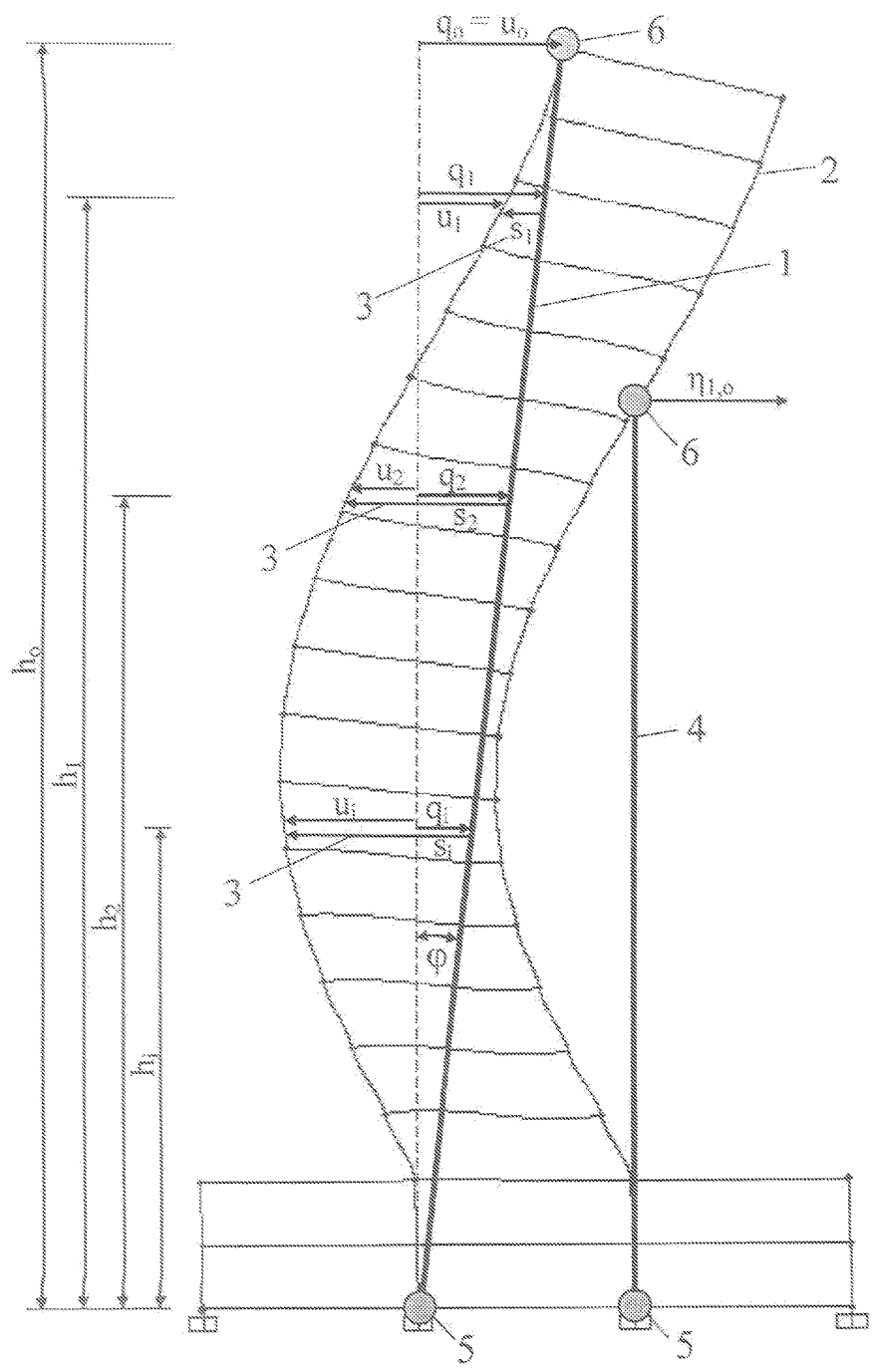
FIG. 1 schematically shows a model structure (2), where two axial elements (1) and (4) of different lengths are installed in order to measure the relative displacement of the structure (2) in real time.

The invention consists in an axial element (1) (FIG. 1), which is installed between two different points of a structure (2). As an example, FIG. 1 schematically shows a frame of the building. The invention can be also used in any structure (bridges, seaports, warehouses, transmission lines, etc.). Should the structure (2) starts moving due to earthquake, wind, rotation of machinery, persons, vehicles or any other source, the rotation $\phi$ of the axial element (1) can be measured. Knowing the rotation of the axial element (1), the relative displacement of the axial element (1) can be obtained with respect to the not distorted structure at different heights $h_i$ through:

$$q_i = \phi \cdot h_i$$

With sensors (3), which measure the relative displacement $s_i$ between the axial element (1) and the structure (2) at different heights $h_i$, the relative displacement of the structure (2) with respect to the not distorted structural configuration can be obtained through:

$$u_i = q_i + s_i = \phi \cdot h_i + s_i$$

$u_o$ and $s_o$ are equal to zero, because there is no relative displacement between the axial element (1) and the structure (2) where the axial element is connected to the structure (2).

With the axial element installed (1) it is possible to obtain the full discrete form of the structural displacement in real time. If only the displacement is of interest, the floor sensors (3) are not necessary.

By introducing a second axial element (4) of a different length into the same structure (2), it is possible to determine the contribution of the upper mode in the total displacement. This can be useful if modal displacements are used as feedback signal to monitor active or semi-active devices. As an example, let us assume that the contribution of the third mode displacement can be set aside, as well as the upper mode of the structure (2). After the displacement in real time corresponding to the first structural mode, measurement can be made if an axial element (4) is installed where the structure (2) has a node for the second mode of vibration. In practical applications, the assumption that the third mode and the upper mode have not much participation in the total structural displacement is, in some cases, appropriate. With the displacement of the first mode measured $n_{1,o}$ in the point where the second mode passes through point zero, the first mode's form of discrete displacement can be obtained in real time:

$$\eta_1 = v_1 \cdot \eta_{1,o}$$

$v_1$ represents a normalized vector that describes the first mode of the structure (2). This vector can be for example estimated by numerical simulations of the structure (2) or by procedures of parametric or non-parametric structural identification. The in real time discrete displacement form of the second mode can be calculated through:

$$\eta_2 = u - \eta_1$$

The axial element (1, 4) is pre-stressed, so that the natural frequencies of the axial element are significantly greater than the natural frequencies of the structure (2). This prevents the natural vibrations of the axial element (1, 4) from introducing unacceptable disruptions in the rotation signal $\phi$ measured between the axial element (1, 4) and the structure (2). The high frequencies of the axial element (1, 4) can be achieved using a material for the axial element (1, 4) of low mass density and that can be pre-stressed at high axial loads. As an example of the case shown in FIG. 2, the axial element (1, 4) materializes through a laminar carbon sheet that meets these requirements very well.

Figure 2:
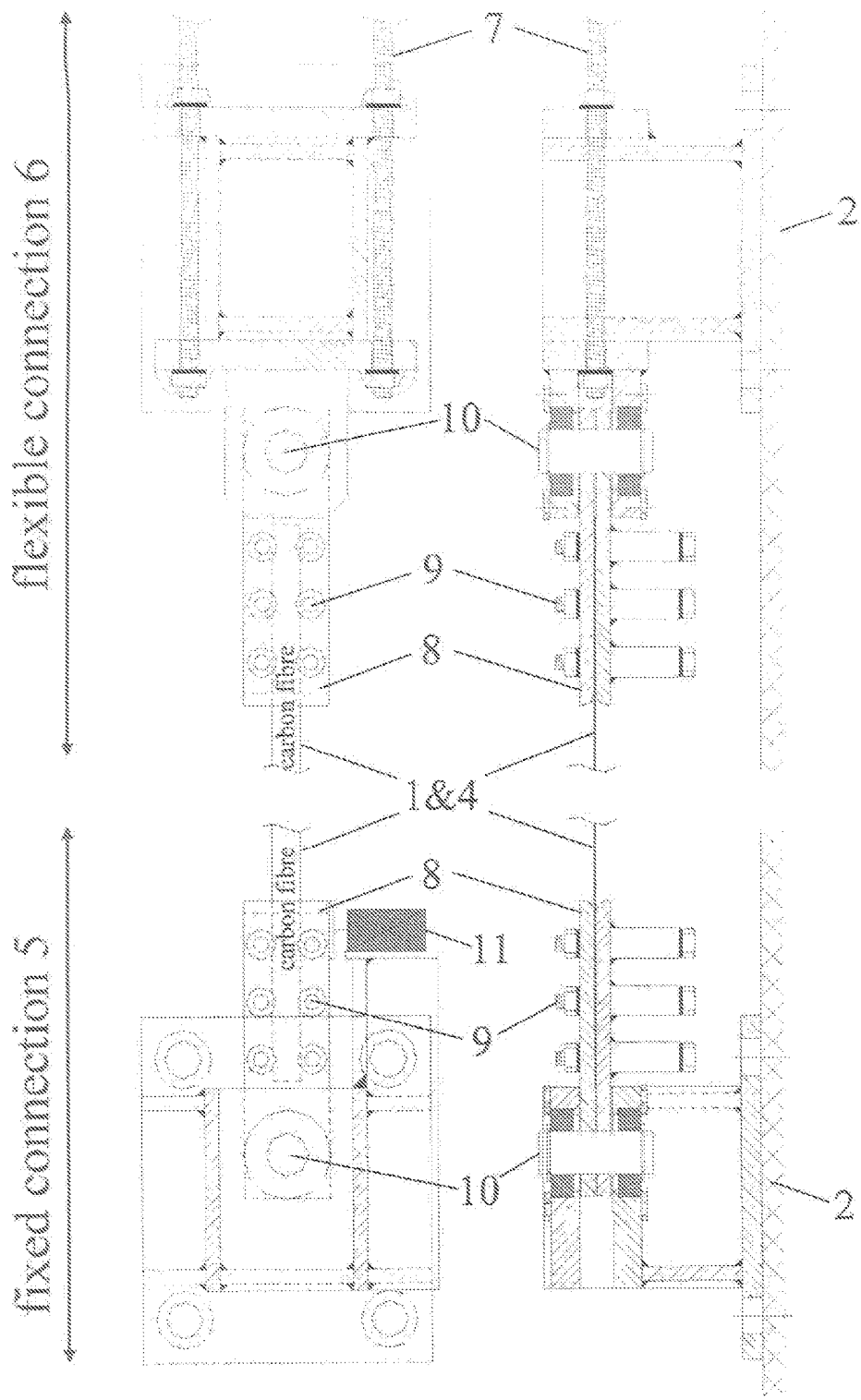
FIG. 2 shows the fixed and flexible connections of the axial element (1) and (4) to the structure (2). In the case presented herein, the axial element materializes as a carbon fiber sheet.

In FIG. 2 a possible configuration is shown for the fixed connection (5) and for the flexible connection (6) between the axial element (1, 4) and the structure (2). The flexible connection (6) allows pre-stressing the axial element (1, 4) through two threaded bars (7). In the case of the carbon fiber sheet as material of the axial element (as shown in FIG. 2), the carbon fiber can be fixed keeping a sheet between two steel plates (8), which are pre-stressed together by several screws (9). For a different material of an axial element (1, 4) other connections can be necessary (5) and (6) to the structure (2) and other fixings of the axial element.

The bolt (10) in FIG. 2 allows the rotation of the plane (joint) between connections (5) and (6) and fixing the steel plates (8) of the axial element (1, 4). This rotation $\phi$ between the axial element (1, 4) and the structure (2) can be measured with different types of sensors, such as potentiometers, inclinometers, accelerometers used as inclinometers, gyrocompasses, gyroscopes or displacement sensors with the laser sensor (11) shown in FIG. 2.

If inclinometers or accelerometers are used, depending on the excitation inlet expected of the structure (2) and the position where $\phi$ is measured, it is necessary to consider that these sensors also measure absolute movements of the building. Due to this, additional sensors must be installed directly in the structure (2), so that the relative rotation between the axial element (1, 4) and the structure (2) can be determined by subtracting the two signals. If a displacement sensor as the laser sensor (11) shown in FIG. 2 is used, the sensor measures the relative displacement between the connection (5) or (6) and the steel plate (8). This displacement measured can lead to the relative target displacement in real time $q_i$ without calculating rotation $\phi$ first.

It should be considered that the points of the structure (2), where the axial element (1, 4) is connected, experience structural rotation. Except for the use of a gyrocompass or a gyroscope to measure rotation $\phi$, the sensors used measure the relative rotation between the axial element (1, 4) and the point where this axial element (1, 4) is installed.

In such cases, the rotation of the structure (2) where the axial element (1, 4) is connected, distorts the measurement of the relative target displacement. It is therefore important to measure the relative rotation $\phi$ in a point of the structure, where its rotation can be set aside. In the case of a building, this could be underground, as shown in FIG. 1.

Only for simplicity, in FIG. 1 measurements in real time are only in one direction of the structure (2). The invention can be also applied to measure the displacements of a structure (2) in real time, with an axial element in each of the two perpendicular directions. With a second sensor (11), the rotation of the axial element (1, 4) in the perpendicular direction can be measured to remove the displacement of the plane of the structure shown in FIG. 1. In such cases, connecting the axial element (1, 4) to the structure (2) with a bidirectional joint is necessary.

For bidirectional displacements of a structure (2), installing the sensors (3) in the axial element can be necessary, as well as measuring the axial element (1) to the structure (2) and not inversely. In such cases, contact-free displacement sensors should be used (for example, laser sensors). Their weight should be considered in the design, since the sensors (3) installed in the axial element (1) will reduce the frequencies of the axial elements. The latter should be always away from the structure frequencies.

The invention claimed is:

1. A system to measure in real-time dynamic displacements of structures relative to a reference, the system comprising:
    one or more axial elements installed and pre-stressed between two connection points of a flexible structure having a base; and a rotation measuring sensor configured to measure rotation between a reference of the structure and the axial elements, wherein the measuring sensor is placed at a fixed-to-the-base connection or alternatively at a fixed-to-the structure connection which forms the connection points of the axial elements to the structure, to obtain a relative displacement between the reference and the axial elements, measured in perpendicular direction to the axial elements, and obtained by multiplying a length of the axial elements by a tangent function of the measured rotation $\phi$ between the reference and the axial elements, wherein the relative displacement obtained can be used in controlling structural vibrations due to natural causes selected from the group consisting of earthquakes, wind, sea waves, and human generated actions through machines, people movement, vehicles, explosions, or other sources, wherein the system further comprises another axial element, also pre-stressed and installed between another two connection points of the flexible structure wherein one of said another two connection points is selected to be a node of a higher mode of the structure, to filter the contribution of this higher mode in the measured displacement.

2. The system according to claim 1, further comprising displacement sensors between the axial elements and the flexible structure to obtain a displacement shape of the structure at discrete points by measuring the relative structural displacements perpendicular to the axial element.

3. The system according to claim 1, comprising two or more pre-stressed axial elements to measure more than one relative displacement between two points of the flexible structure where one of the two points is a modal node in the flexible structure to identify independent modal contributions to the obtained displacement.

4. The system according to claim 1, wherein two or more axial elements are installed in the flexible structure for measuring the rotational motions, rocking motions, or any other differential motions of the structure.

5. The system according to claim 1, wherein the same axial element measures displacement in two principal directions of the structure using a bi-directional or spherical hinge of the axial element where one or more sensors are installed to measure displacements in the two principal directions of a structure.

6. The system according to claim 1, wherein the measuring sensor to obtain the relative displacement between the reference and the axial pre-stressed elements is a displacement sensor selected from the group consisting of a laser sensor, a potentiometer, an inclinometer, an accelerometer used as an inclinometer, a gyrocompass, a gyroscope, and other sensors used to measure rotations.

7. The system according to claim 1, wherein the axial elements are materialized as a lamella of carbon fibre or any other material with similar physical properties that minimize perturbations introduced into the measurements by natural vibrations of the axial elements and attain similar or better signal-to-noise ratios.

8. The system according to claim 1, wherein the fixed-to-the-base connection and the fixed-to-the-structure connection for the axial elements, connects to points of the flexible structure, capable of allowing rotations of the axial elements.

9. The system according to claim 8, wherein other types of connections that allow rotations of the axial elements to the structure are used.

10. The system according to claim 1, further comprising a metallic grip system used to anchor the axial elements.

11. The system according to claim 10, wherein other types of anchorage systems of axial elements are used.

12. Use of the system for measuring relative dynamic structural displacements according to claim 1, for being used in any type of buildings, planes, ships, trains, automobiles, bridges, towers, chimneys, industrial structures, equipment, lifelines, any kind of machinery, and others.

13. Use of the system for measuring relative dynamic structural displacements according to claim 12, for real-time active and semi-active structural vibration control caused by natural or human induced structural vibrations.

14. Use of the system for measuring relative dynamic or static structural displacements according to claim 12, for structural health monitoring, system identification, or others than vibration control of an active or semi-active vibration control device.

* * * * *